Aug. 18, 1931.  E. N. FALES  1,819,155
INSTRUMENT FOR INDICATING VELOCITY AND DIRECTION OF FLOW OF FLUID
Filed June 27, 1923  2 Sheets-Sheet 1
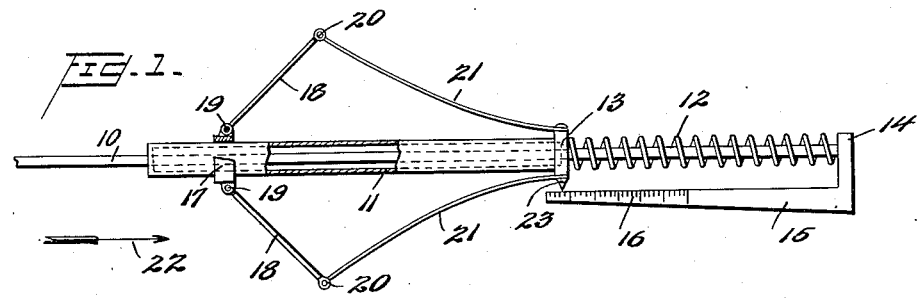
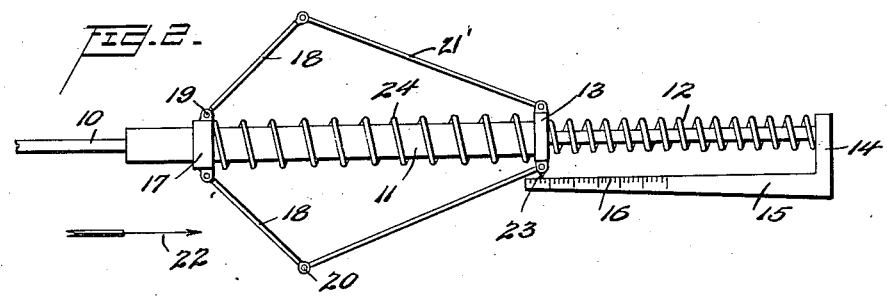
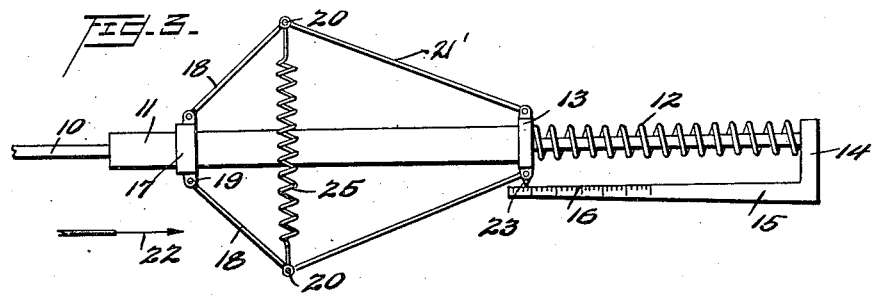
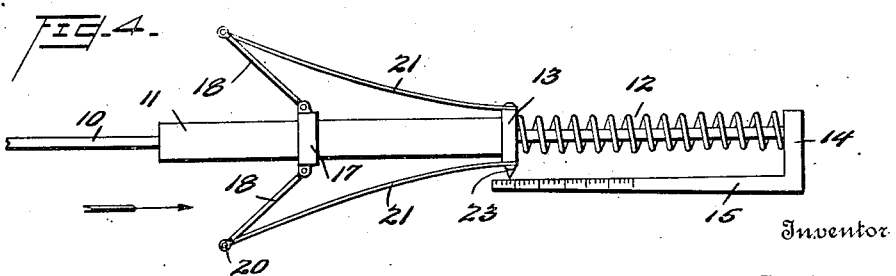

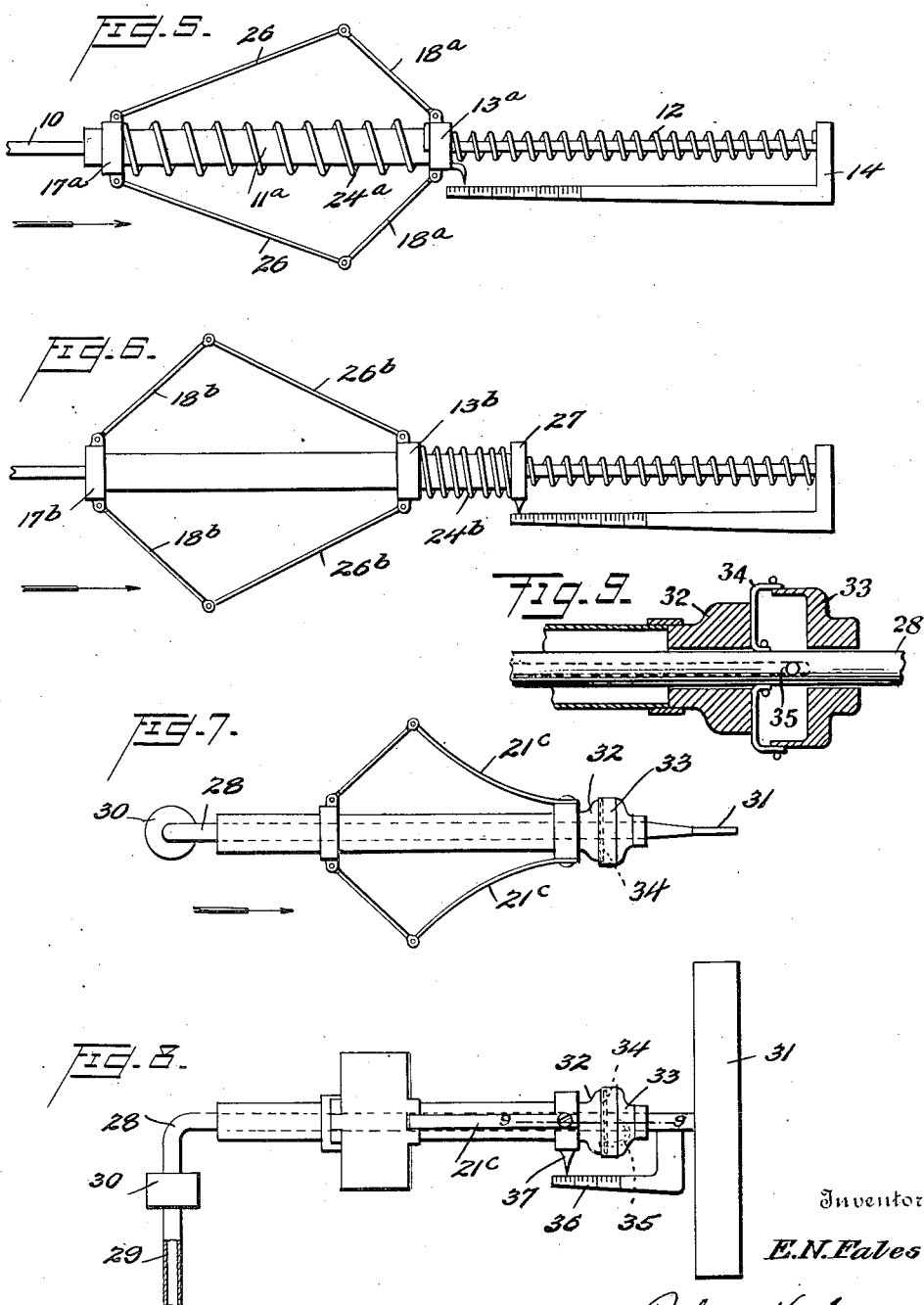

Patented Aug. 18, 1931

1,819,155

UNITED STATES PATENT OFFICE

ELISHA N. FALES, OF DAYTON, OHIO

INSTRUMENT FOR INDICATING VELOCITY AND DIRECTION OF FLOW OF FLUID

Application filed June 27, 1923. Serial No. 648,049.

This invention relates to an instrument for indicating velocity and direction of flow of fluid.

The object of the invention is to provide means adapted to accurately measure the flow of fluid in motion and it is often times desirable to have such an instrument, the readings of which are not in proportion to the square of the velocity. For example, the conventional "pressure plate" has a plate normal or at a right angle to the air stream and the pressure increases as the square of the velocity. If it be desired to have the pressure increase faster than the square of the velocity, or slower than the square of the velocity, a different instrument will be required.

The present invention may be understood by imagining that the area of the pressure plate above mentioned is automatically altered by a change of pressure thereon due to the moving fluid. Thus, if the pressure plate above mentioned were to increase its area with an increasing velocity, it is seen that the pressure resulting would be that due to both the increased velocity and to the increased area.

To the above end the invention consists in the novel construction, combination and arrangement herein shown, described and claimed.

In the accompanying drawings.

Figure 1 illustrates the main characteristics of the improved instrument, showing one means for controlling the effective area of the vanes or pressure surfaces.

Figure 2 is a similar view showing another arrangement of tensioning means.

Figure 3 is a similar view showing still another form of tensioning means.

Figure 4 is a view of a modified form of the instrument.

Figures 5 and 6 show other modifications of the instrument involving however the same principle.

Figure 7 is a plan view of an instrument especially adapted for operating a register or recorder at a distance therefrom.

Figure 8 is a side elevation of the same.

Figure 9 is a longitudinal sectional view taken on the line 9—9 of Fig. 8.

Referring primarily to Figure 1, 10 designates a guide which may be in the form of a simple rod of metal. Floatingly mounted and adapted to slide upon said rod is a sleeve 11, sliding movement thereof being resisted by compression spring 12 coiled around the guide 10 and interposed between a collar 13 fixed at one end of the sleeve 11 and a fixed stop or member 14 which is shown as provided with a graduated arm 15 having a scale 16 thereon to indicate the velocity of the fluid.

A movable collar 17 encircles the sleeve 11 and is slidable lengthwise thereof. Vanes or pressure surfaces 18 preferably in the form of plates of any suitable material are connected to the collar 17 by pivots 19, while the outer of free ends or edges of the vanes 18 are connected by pivots 20 to the free extremities of leaf or bow springs 21. The springs 21 are attached at their opposite extremities to the collar 13.

It will now be seen that as fluid moving in the direction of the arrow 22 in Figure 1 exerts a pressure against the vanes 18, the tendency is to move the free ends of the vanes 18 outwardly, such outward movement being however, resisted by the springs 21. The greater the pressure of the fluid, the greater will become the effective area of the vanes and the total pressure of the fluid against the vanes will be transmitted to and resisted by the compression spring 12. A pointer 23 on the collar 13 moves along the graduated scale 16 and the total pressure is indicated thereby.

Instead of employing the type of spring 21 shown in Figure 1, a coiled compression spring 24 may be employed together with connecting links 21' as shown in Figure 2, said spring 24 encircling sleeve 11 between the fixed collar 13 and the slidable collar 17. In this case links 21' are connected to vanes 18 and collar 13. The operation of the instrument will be identical with that above described.

One or more contractile springs 25 may be used instead of springs 21 and 24 above referred to, said contractile springs 25 being terminally connected to the free edges of the vanes 18 at the pivot points 20 as shown in Figure 3.

In Figure 4 the vanes 18 are slanted in the opposite direction as compared with Figures 1, 2 and 3 so that as the fluid pressure increases, the effective area of said vanes decreases. The effective area however, varies as the pressure of the fluid varies. In some instruments it may be desirable to increase the effective area of the vanes as in Figures 1, 2 and 3, while in other instruments it may be found desirable to decrease the effective area thereof as in Figure 4.

Figure 5 shows the vanes 18a as connected pivotally to the stationary collar 13a instead of the movable collar 17a, with links 26 connecting the free edges of the vanes with said movable collar 17a. A compression spring 24a encircles the sleeve 11a between the collars 13a and 17a. In this case as the pressure of the fluid increases, the effective area of the vanes is increased.

Under another arrangement of the elements shown in Figure 6, the vanes 18b are pivotally connected to a fixed collar 17b and the links 26b connect the free edges of the vanes with a movable collar 13b. In this case the compression spring 24b is interposed between the collar 13b and a stop flange 27 on the end of the sleeve 11. In this case also, the collar 17b is stationary while the collar 13b is slidable against the tension of the spring 24b.

In Figures 7 and 8 the guide rod is replaced by a tubular rod 28 having a substantially upright portion 29 adapted to turn in bearings 30 when the air stream acts upon the vertical stabilizer 31 at the trailing end of the tubular rod 28. In this case the springs 21c act on the movable head 32 of a pressure diaphragm box 33, said head 32 serving to distort a flexible diaphragm 34 causing the air contained in the box 33 to be forced through a passage 35 in said box and through the bore of the rod 28 and 29 outwardly to a room below, it being understood that the device is mounted on the roof of a building, while the pressures on the vanes thereof are, by the means described, transmitted to an indicating register below. If desired, the pressures may be indicated directly on the scale 36 by the pointer 37 carried by the movable head 32 as shown in Figure 8.

It will be understood that the device is shown in each of the Figures 1 to 8 inclusive as being in its initial position; that is to say in a position where there is no stress on the springs. The leaf springs in Figures 1, 4, 7, and 8 are shown with their normal curvature and exert no tendency to force the collars along the guides in either direction. The coil springs in Figures 2, 3, 5, and 6 are also shown in a position of rest; that is to say, a position in which they are under no load.

The basic idea of the invention resides in the means for altering the effective area of the vanes or pressure surfaces simultaneously with and due to the alteration of the forces by velocity changes in the air stream or flow of the fluid. The resulting movement of the vane is then due to a compound rather than a simple change in the actuating force.

I claim:

1. An instrument for indicating the velocity of fluid in motion, including a rod having a sleeve slidable thereon, a collar fixed on said sleeve, a second collar slidable on said sleeve, pressure vanes pivotally mounted on said slidable collar, means in connection with said fixed collar and in pivotal connection with said vanes to yieldably retain said vanes in an operative position, means mounted on said rod tending to resiliently resist movement of said sleeve along said rod under influence of said vane pressure and means for measuring the movement of said sleeve on said rod.

2. An instrument for indicating the velocity of fluid in motion, including a rod having a sleeve slidable thereon, a collar movable of said sleeve, pressure vanes on said collar, means for yieldably retaining said vanes in an operative position, means mounted on said rod tending to resiliently resist movement of said sleeve along said rod under influence of said vane pressure and means for measuring the sliding movement of said sleeve.

3. An instrument for indicating the velocity and direction of flow of fluid, including a hollow tube having a vane at one end, means whereby said hollow tube is pivoted to rotate about an axis transverse to its length, a sleeve slidable on said tube having a collar movable thereon, pressure surface members on said collar, a pressure chamber in communication with said hollow tube, and means operative by said sliding sleeve to effect a pressure in said chamber in proportion to the thrust of said sleeve.

4. An instrument for indicating the velocity of fluid in motion comprising a pressure surface, the effective area of which is modified under varying fluid pressures, a support, a support for said pressure surface and slidably mounted on said first mentioned support, means yieldably resisting relative movements of said supports, means yieldably retaining said pressure surface in an angular position determined by fluid pressure and means to indicate the degree of fluid pressure against said pressure surface in accordance with the extent of said movement.

5. An instrument for indicating the velocity of fluid in motion comprising a pivotally movable pressure surface, the effective area of which is altered by movement thereof under varying fluid pressures, a support, means yieldably retaining said pressure surface in an angular position determined by the fluid pressure, a support for said pressure surface and retaining means slidably mounted on said first mentioned support, means adapted to resist the unitary bodily movement of said pressure surface and retaining means and means to indicate the degree of fluid pressure against said pressure surface in accordance with the extent of said movement.

6. An instrument for indicating the velocity of fluid in motion comprising a pivotally and bodily movable pressure surface, the effective area of which is altered by an angular movement thereof under varying fluid pressures thereon, a support, means yieldably retaining said pressure surface in an angular position determined by the fluid pressure, a support for said pressure surface and retaining means slidably mounted on said first mentioned support, yieldable means adapted to resist the bodily movement of said pressure surface and retaining means and means to indicate the degree of fluid pressure against said pressure surface in accordance with the extent of said movement.

7. An instrument for indicating the velocity of fluid in motion embodying a pivotally and bodily movable pressure surface, the effective area of which is altered by an angular movement thereof under varying fluid pressure thereon, a pivoted support, a support for said pressure surface slidably mounted on said pivoted support, means yieldingly retaining said pressure surface in an angular position determined by the fluid pressure, yieldable means for resisting relative movement of the supports; means mounted on said supports for measuring said relative movement and means for positioning the surface in the direction of flow of the fluid.

In testimony whereof I affix my signature.

ELISHA N. FALES.